(12) United States Patent
Mizuta et al.

(10) Patent No.: US 7,792,557 B2
(45) Date of Patent: Sep. 7, 2010

(54) SLIDE-TYPE PORTABLE COMMUNICATION APPARATUS

(75) Inventors: Masatomo Mizuta, Tokyo (JP); Kazuo Ohtsuta, Tokyo (JP); Kiyoshi Kohayakawa, Tokyo (JP); Michio Nagai, Tokyo (JP); Mika Fujii, Tokyo (JP); Masaki Shimamura, Tokyo (JP)

(73) Assignee: NEC Corporation, Tokyo (JP)

( * ) Notice: Subject to any disclaimer, the term of this patent is extended or adjusted under 35 U.S.C. 154(b) by 1994 days.

(21) Appl. No.: 10/279,978

(22) Filed: Oct. 25, 2002

(65) Prior Publication Data

US 2003/0171133 A1    Sep. 11, 2003

(30) Foreign Application Priority Data

Oct. 26, 2001  (JP) .............................. 2001-328921
Jul. 15, 2002  (JP) .............................. 2002-205148

(51) Int. Cl.
    H04M 1/00    (2006.01)
(52) U.S. Cl. .............. 455/575.4; 455/575.1; 455/575.3; 455/575.8
(58) Field of Classification Search .............. 455/550.1, 455/556.1, 566, 567, 90.3, 575.1
    See application file for complete search history.

(56) References Cited

U.S. PATENT DOCUMENTS

| | | | |
|---|---|---|---|
| 5,450,619 A | | 9/1995 | Maeda |
| 5,719,936 A | * | 2/1998 | Hillenmayer ................ 379/447 |
| 5,894,298 A | | 4/1999 | Hoeksma |
| 6,009,338 A | * | 12/1999 | Iwata et al. .............. 455/575.4 |
| 6,073,027 A | | 6/2000 | Norman et al. |
| 6,088,585 A | * | 7/2000 | Schmitt et al. .............. 455/411 |
| 6,304,765 B1 | * | 10/2001 | Cosgrove et al. ......... 455/575.3 |
| 6,308,084 B1 | * | 10/2001 | Lonka ..................... 455/556.1 |
| 6,782,242 B1 | * | 8/2004 | Koleda et al. .............. 455/90.3 |
| 2001/0005179 A1 | * | 6/2001 | Hutchison ................... 343/763 |
| 2001/0009847 A1 | * | 7/2001 | Kim et al. ..................... 455/90 |
| 2002/0032043 A1 | * | 3/2002 | Ishikawa .................... 455/566 |
| 2002/0068533 A1 | * | 6/2002 | Bilotti et al. .................. 455/90 |

(Continued)

FOREIGN PATENT DOCUMENTS

CN    1177268 A    3/1998

(Continued)

OTHER PUBLICATIONS

Japanese Office Action dated Jan. 4, 2005, with partial English translation.

(Continued)

*Primary Examiner*—Patrick N Edouard
*Assistant Examiner*—Dai A Phuong
(74) *Attorney, Agent, or Firm*—McGinn IP Law Group, PLLC

(57) ABSTRACT

A portable communication apparatus includes a main housing having at least a display section and an operation section and a movable housing that is engaged with the main housing slidably in a longitudinal direction between a retracted state and an extended state. The main housing and the movable housing are urged in an extension direction and are releasably locked in the retracted state. A portion of the display section is covered and protected by the movable housing when retracted. An optical aperture for optical function is provided in the main housing and its optical function is made operable when extended.

20 Claims, 11 Drawing Sheets

U.S. PATENT DOCUMENTS

| | | | |
|---|---|---|---|
| 2002/0183031 A1* | 12/2002 | Yamagishi | 455/277.2 |
| 2002/0193136 A1* | 12/2002 | Halkosaari et al. | 455/550 |
| 2003/0038786 A1* | 2/2003 | Nguyen et al. | 345/169 |
| 2004/0067784 A1* | 4/2004 | Kubo et al. | 455/575.4 |
| 2005/0288055 A1* | 12/2005 | Lubowicki et al. | 455/550.1 |

FOREIGN PATENT DOCUMENTS

| | | |
|---|---|---|
| CN | 1216658 A | 5/1999 |
| DE | 198 06 508 A1 | 8/1999 |
| DE | 199 23 025 A1 | 11/2000 |
| EP | 0 535 903 A1 | 9/1992 |
| EP | 0 536 578 A2 | 9/1992 |
| EP | 0 804 009 A2 | 10/1997 |
| EP | 0 969 644 A1 | 6/1999 |
| EP | 0 969 644 A1 | 1/2000 |
| GB | 2 266 429 A | 10/1993 |
| JP | 5-91015 | 4/1993 |
| JP | 7-131848 | 5/1995 |
| JP | 7-312631 | 11/1995 |
| JP | 8-186517 | 7/1996 |
| JP | H09-065436 | 3/1997 |
| JP | 9-205476 | 8/1997 |
| JP | 10-42022 | 2/1998 |
| JP | 10-271192 | 10/1998 |
| JP | 10-285258 | 10/1998 |
| JP | 2000-78254 | 3/2000 |
| JP | 2000-106594 | 4/2000 |
| JP | 2000-506324 | 5/2000 |
| JP | 2000-332871 | 11/2000 |
| JP | 2001-24762 | 1/2001 |
| JP | 2001-127859 | 5/2001 |
| JP | 2001-237936 | 8/2001 |
| JP | 2002-94624 | 3/2002 |
| WO | WO 97/31468 | 8/1997 |
| WO | WO 98/09414 | 3/1998 |

OTHER PUBLICATIONS

European Search Report dated Mar. 13, 2003.
European Search Report dated Mar. 13, 2003.
English Translation of the Chinese Office Action dated Jun. 11, 2004.
European Search Report dated Apr. 8, 2004.
Japanese Office Action dated Feb. 7, 2006 (with partial English translation).
Chinese Office Action dated Feb. 9, 2007, with English translation.
Chinese Office Action dated Oct. 12, 2007 (with English translation).
Japanese Office Action dated Jun. 14, 2005 (with partial English translation).

* cited by examiner

FIG.1A
FIG.1B
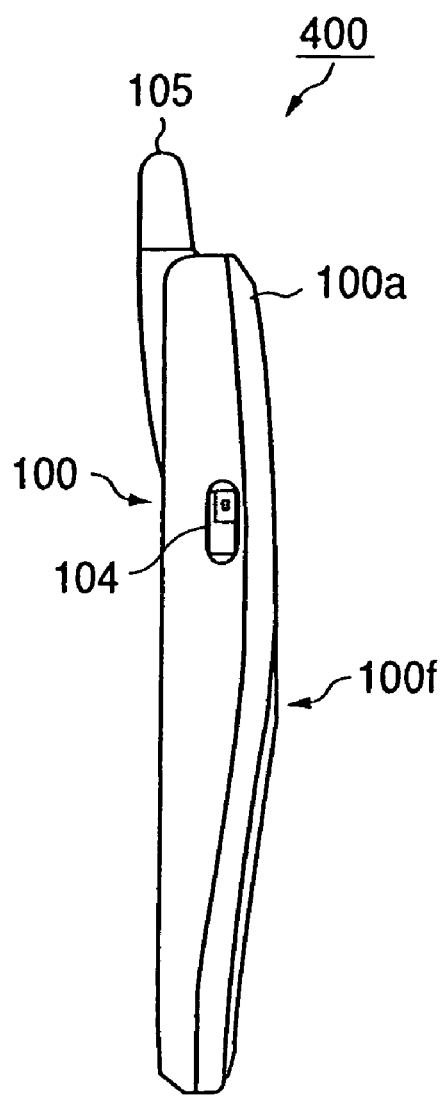
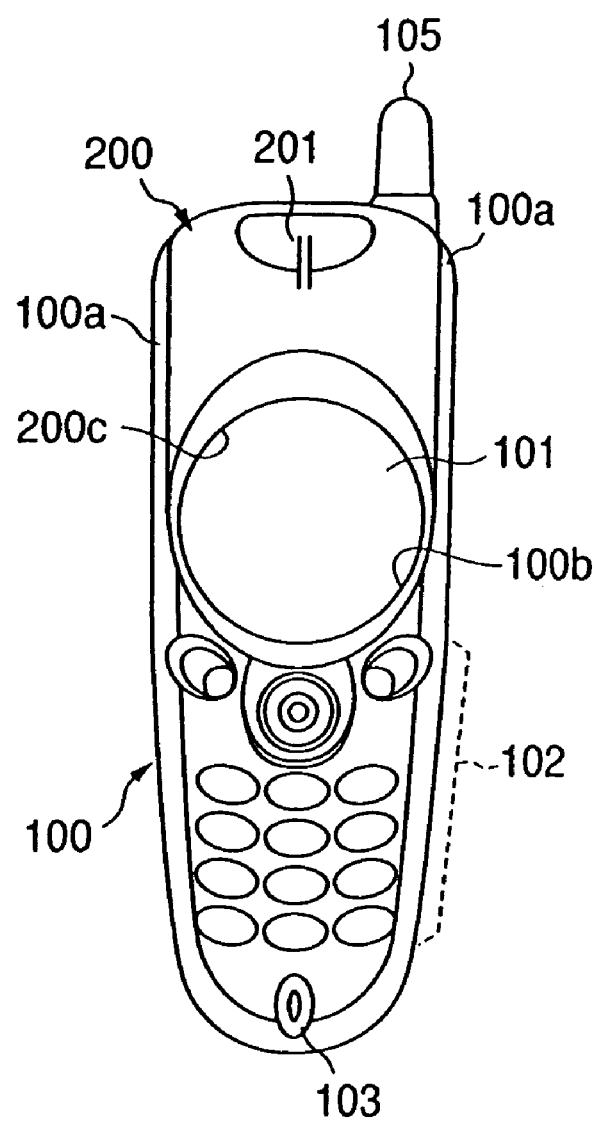

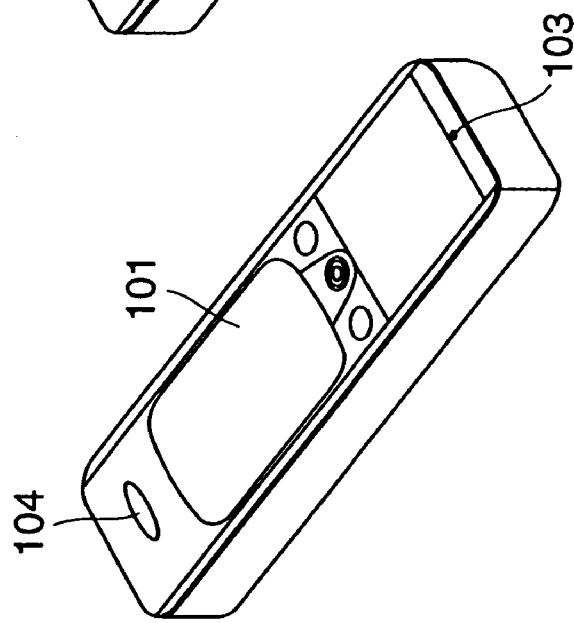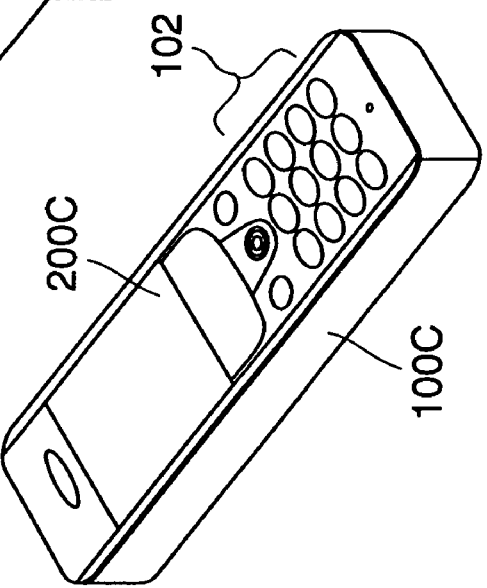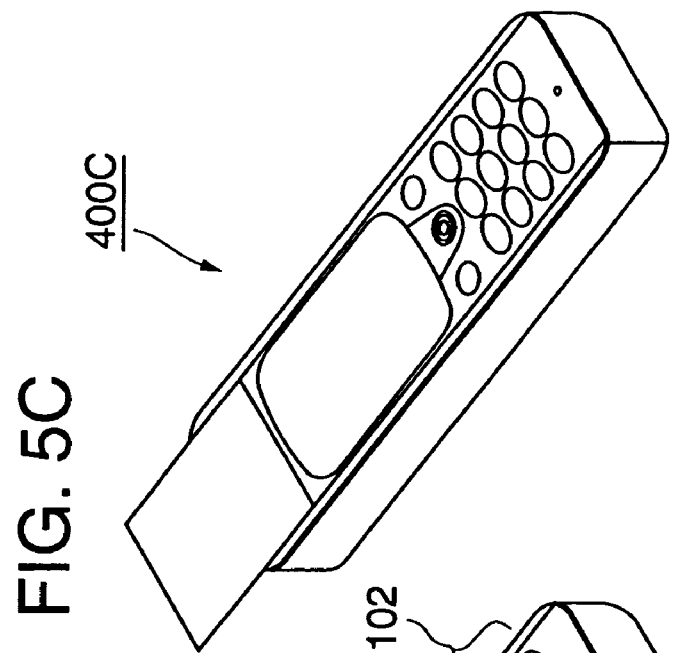

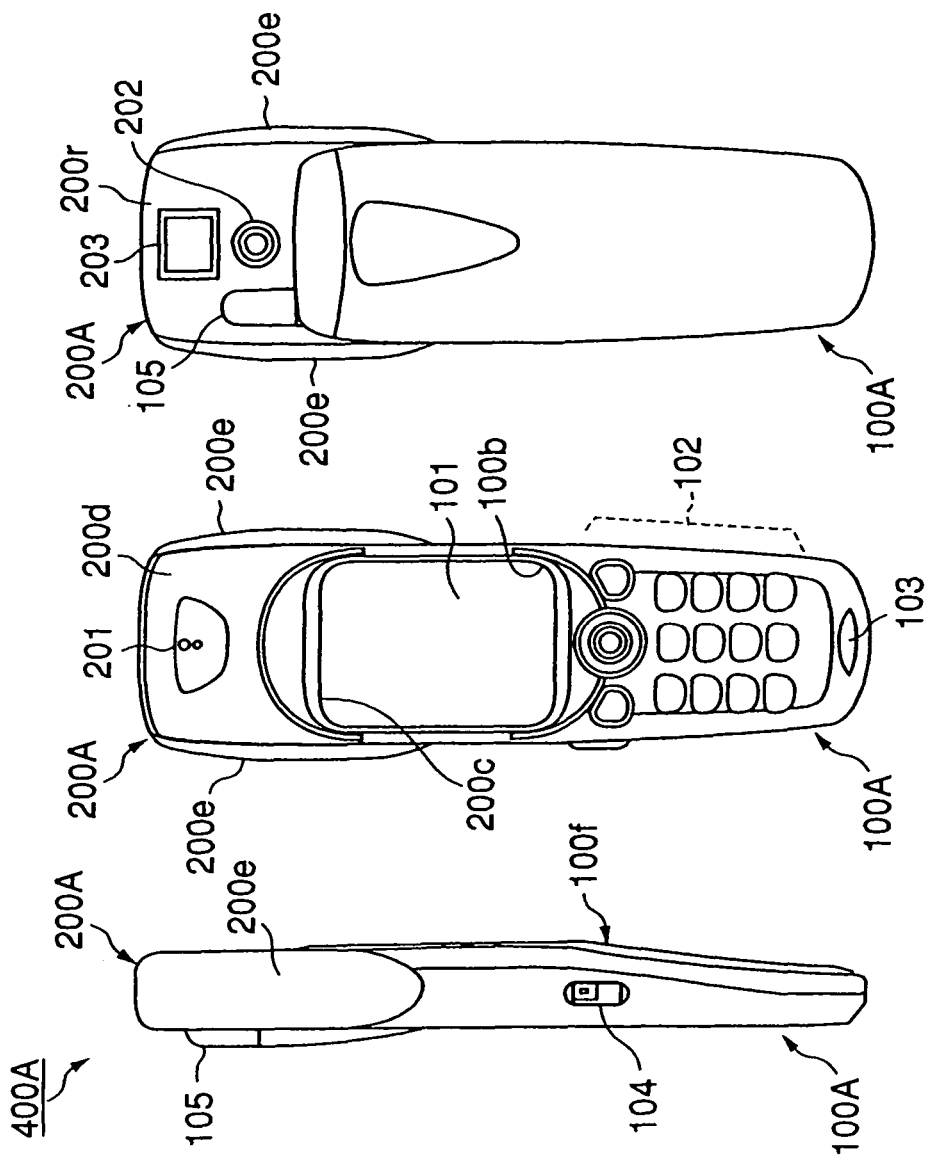

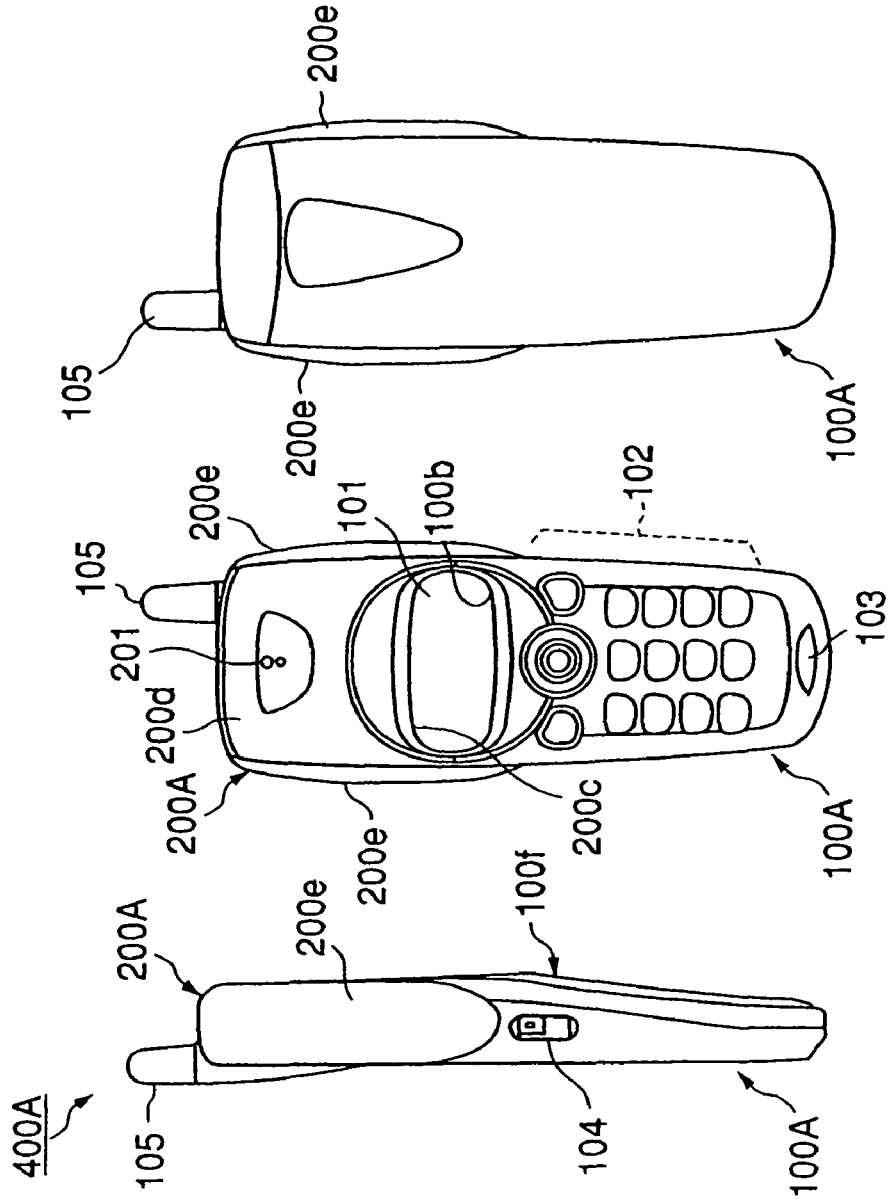

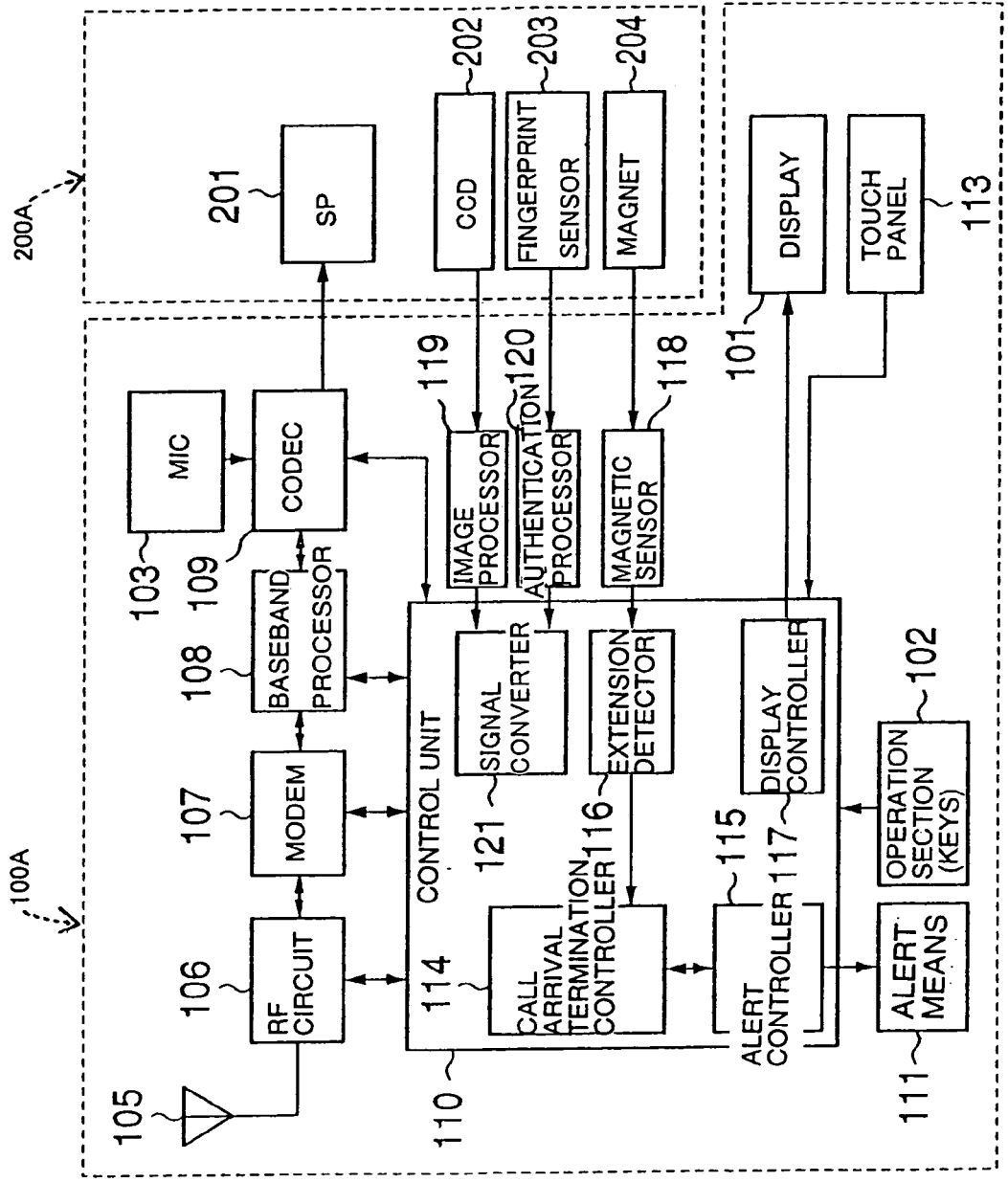

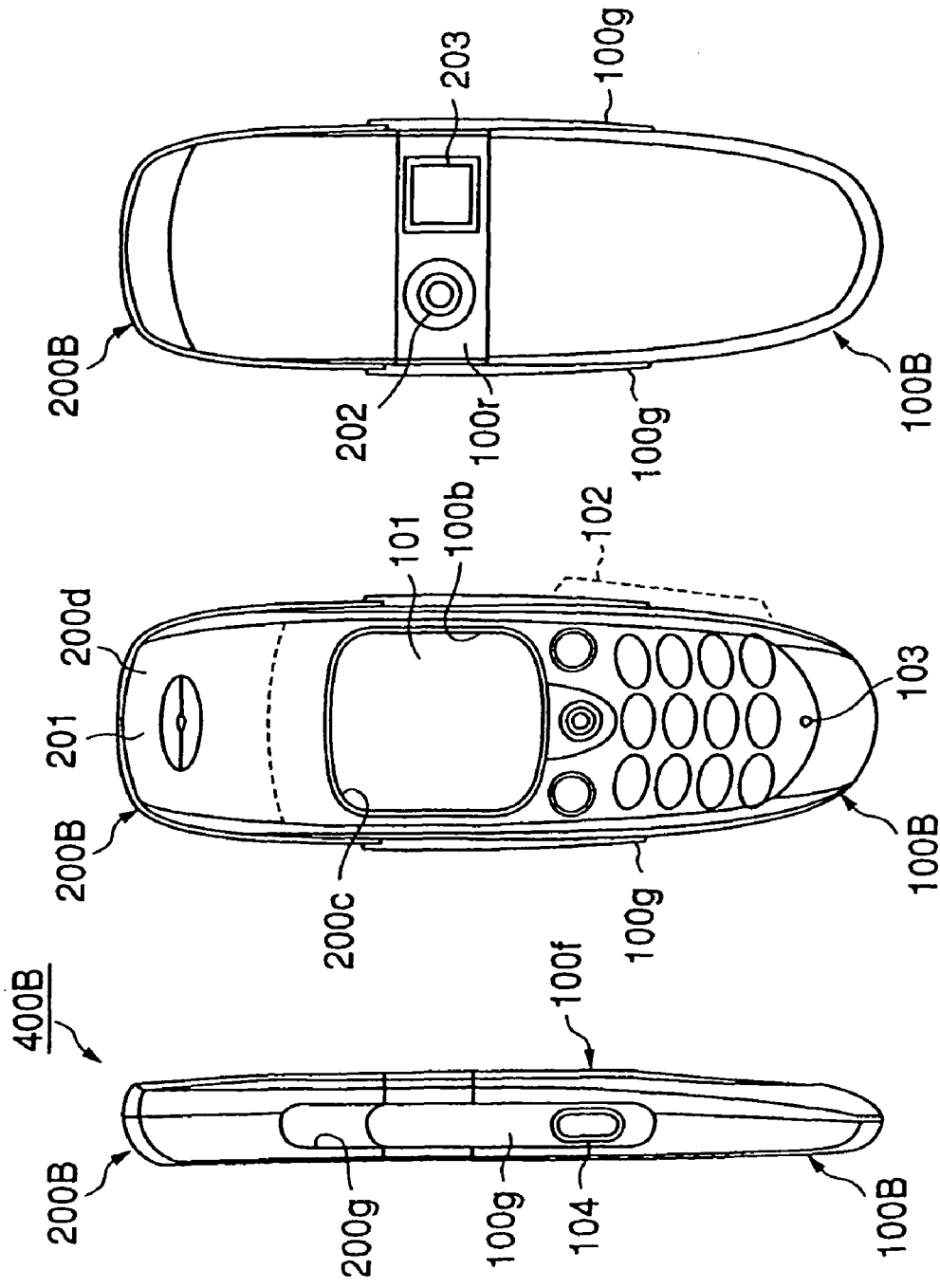

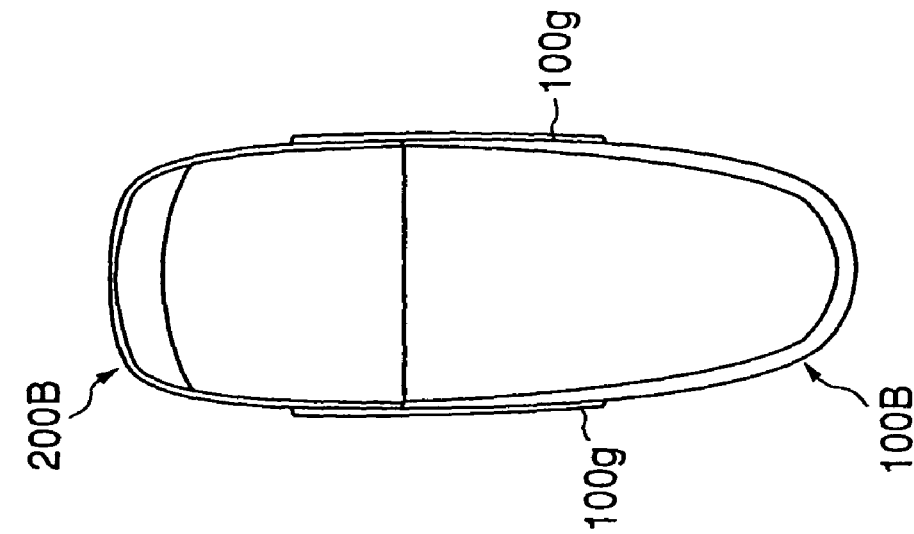
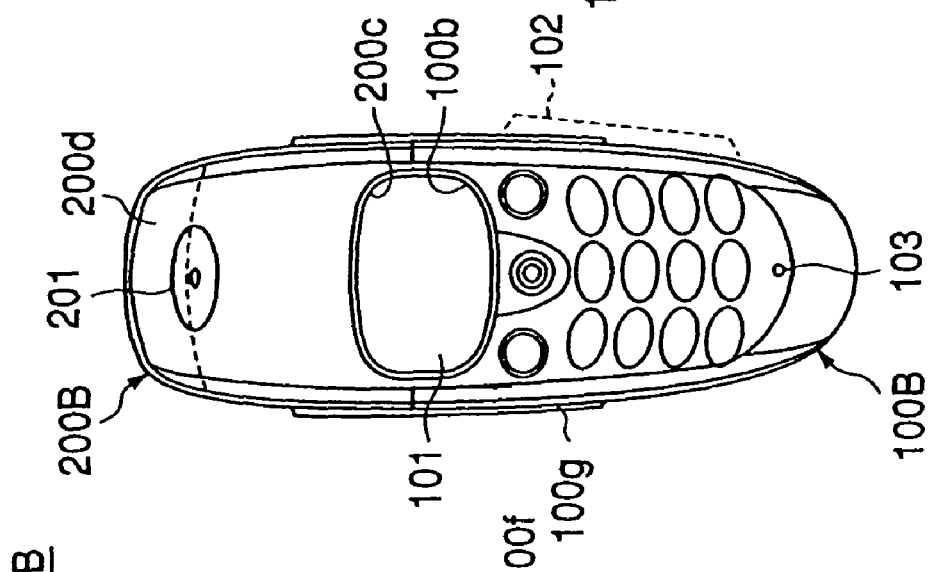
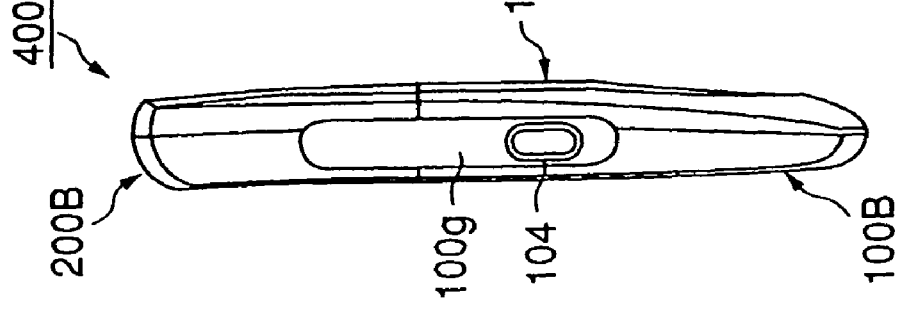

SLIDE-TYPE PORTABLE COMMUNICATION APPARATUS

BACKGROUND OF THE INVENTION

1. Field of the Invention

The present invention relates to a portable communication apparatus such as a portable telephone, and more particularly, to a portable communication apparatus having a slide-type structure provided with unprecedented functions to improve the convenience in use.

2. Description of the Related Art

In recent years, the portable telephone set has become to be used not only just for speech communication, but also as a portable information terminal having additional functions such as a browser for the Internet or the like, an E-mail transmission/reception and schedule control. Accordingly, since the contents to be displayed include a lot of character information, images and the like, it is desired that the display device is large in size.

In addition to a straight-type portable telephone apparatus, foldable or slidable structures have been employed to meet the needs for miniaturization. The foldable or slidable structure is very suitable for installation of a large-sized display device. In a foldable portable telephone, the display device is mounted in general such that, when folded and not used, its display faces inside to be protected. Some foldable portable telephones are provided with a secondary display device on its back surface so as to display minimum information even when folded.

The slidable structure is provided with a main housing (first unit) and a movable housing (second unit), which is mounted with a part of functions and is coupled with the main housing so as to be slidable in the longitudinal direction. Such a structure allows the two units to be retracted with overlapping one another when carried and to be extended by sliding them in the longitudinal direction when communicating or the like. Many slidable portable telephones are designed such that, when folded and not used, its display faces inside to be protected.

For example, Japanese Unexamined Patent Application Publication No. 7-312631 discloses a portable radio apparatus, which comprises a first housing having at least a receiver and a display section, and a second housing, which is accommodated within the first housing so as to be freely slidable and rotatable with respect to the first housing and is provided with an operation section and a transmitter on the front surface thereof. By sliding and rotating the second housing to be accommodated into the first housing, two states are realized: a state that operation and speech communication are available; and a state that the operation face is protected with facing in.

Also, Japanese Unexamined Patent Application Publication No. 5-91015 discloses a small-size portable radio apparatus, which comprises a housing that has a transmitter, a key operation section and a display section and has a recess portion formed extending in the longitudinal direction, and a movable housing that is equipped with a receiver and incorporated into the recess portion so as to be freely slidable. When being out of use, the movable housing can be inserted into the recess portion to compact the entire; and the movable housing can be pulled out to a desired length to be used for speed communication. When the movable housing is inserted into the recess portion to compact the entire, the display section of the housing is partly exposed, allowing the time of day or the like to be displayed thereon. On the other hand, when the movable housing is pulled out, almost all the display section is exposed, allowing the increased amount of information to be displayed thereon.

Further, in Japanese Unexamined Patent Application Publication No. 2001-24762, a portable telephone apparatus is composed of a main body thereof having a display section provided on one side thereof, and a keypad having operation buttons provided on its surface, which is slidable to cover the display section of the main body therewith. When the main body accommodates the keypad, a part of the display section is exposed from the keypad. When the keypad is slid downward, the entire screen of the display section is exposed. The keypad slides up and down along guide rails provided at both right and left sides of the main body. In the portable telephone apparatus, it is possible to enlarge the displayable screen without injuring the portability and the operability to achieve the displaying of a large amount of information such as mail and data. In the accommodation state, information necessary for audio communication is displayed, and by exposing the entire screen, it is possible to read character information such as mail.

In those conventional portable telephone apparatuses, it is necessary to slide two portions into an extended state using both hands to carry out speech communication, resulting in room for improvement of the convenience in use.

Further, a portable telephone having an optical function has been also provided according to the trend of multi-function and high performance. For example, it is mounted with an electronic camera for capturing image data. Furthermore, a portable telephone mounted with a fingerprint recognition system has been provided so that only authorized users can operate the portable telephone itself or identification of a caller can be verified. Such an optical function has an optical aperture section exposed to the outside and any dirt or flaw may prevent it from functioning normally.

SUMMARY OF THE INVENTION

An object of the present invention is to provide a slide-type portable communication apparatus allowing easy operation and enhanced convenience in use.

Another object of the present invention is to provide a slide-type portable communication apparatus allowing an operation section and an optical function section to be appropriately protected while enhancing the convenience in use.

According to the present invention, a portable communication apparatus includes: a main housing having at least a display section and an operation section; a movable housing engaged with the main housing so that said movable housing is freely slidable in a longitudinal direction between a retracted state and an extended state; an urging member for urging said main housing and said movable housing in an extension direction; and a releasable lock mechanism for releasably locking said main housing and said movable housing in the retracted state, wherein the locking is released by a predetermined operation.

Preferably a portion of the display section of said main housing is covered and protected by said movable housing when said main housing and said movable housing are in the retracted state. The other portion of the display section may be exposed even when retracted.

The movable housing may be stopped at a desired one of a plurality of stop positions with respect to the main housing. The main housing may further have a telephone-transmitter provided at a predetermined position thereof and the movable housing may have a telephone-receiver provided at a predetermined position thereof.

The portable communication apparatus may further include an input operation controller for enabling an input operation of the operation section depending on a position of the movable housing with respect to the main housing.

The input operation controller may enable one of an input operation of at least one predetermined key and an input operation of all keys of the operation section depending on the position of the movable housing, wherein setting data is preset to determine said at least one predetermined key.

The display section of said main housing and its side surfaces corresponding to the display section may be covered with said movable housing when said main housing and said movable housing are in the retracted state. The movable housing may be shaped like a sheath, wherein the display section of said main housing and its side and back surfaces corresponding to the display section are covered with said movable housing when said main housing and said movable housing are in the retracted state.

The portable communication apparatus may further include a display controller for divisionally driving the display section depending on a position of the movable housing with respect to the main housing such that the covered portion of the display section is not driven. The portable communication apparatus may further include: a backlighting lamp for illuminating the display section; and a display controller for divisionally driving the display section and the backlighting lamp depending on a position of the movable housing with respect to the main housing such that a portion of the backlighting lamp corresponding to the covered portion of the display section is not driven.

According to another aspect of the present invention, a portable communication apparatus includes: a main housing having at least a display section and an operation section; and a movable housing engaged with the main housing so that said movable housing is freely slidable in a longitudinal direction between a retracted state and an extended state, wherein a portion of said display section of said main housing is covered and protected by said movable housing when said main housing and said movable housing are in the retracted state.

According to still another aspect of the present invention, a portable communication apparatus includes: a main housing having at least a display section and an operation section; a movable housing engaged with the main housing so that said movable housing is freely slidable in a longitudinal direction between a retracted state and an extended state; and at least one optical function section, each of which has an aperture section thereof, wherein said aperture section is provided on a surface of said main housing that is covered and protected by said movable housing when said main housing and said movable housing are in the retracted state, wherein said optical function section is usable only when said aperture section is exposed by extending the said main housing and said movable housing.

BRIEF DESCRIPTION OF THE DRAWINGS

FIG. 1A is a side view of a portable telephone apparatus in a retracted state where a main housing and a movable housing overlap one another, according to a first embodiment of the present invention;

FIG. 1B is a plan view of the portable telephone apparatus of FIG. 1A;

FIG. 5A is a perspective view of a portable telephone apparatus according to a second embodiment of the present invention, where the movable housing is slid at the lowermost position with protecting an operation section;

FIG. 5B is a perspective view of the portable telephone apparatus according to the second embodiment of the present invention, where the movable housing is slid at the middle position so that the upper half of the operation section is covered with the movable housing;

FIG. 5C is a perspective view of the portable telephone apparatus according to the second embodiment of the present invention, where the movable housing is slid at the uppermost position;

FIG. 7A is a side view of a portable telephone apparatus in an extended state where the main housing and the movable housing extendedly slide in a longitudinal direction, according to a third embodiment of the present invention;

FIG. 7B is a plan view of the portable telephone apparatus of FIG. 7A;

FIG. 7C is a rear view of the portable telephone apparatus of FIG. 7A;

FIG. 8A is a side view of the portable telephone apparatus in a retracted state where a main housing and a movable housing overlap one another, according to the third embodiment of the present invention;

FIG. 8B is a plan view of the portable telephone apparatus of FIG. 8A;

FIG. 8C is a rear view of the portable telephone apparatus of FIG. 8A;

FIG. 9 is a schematic block diagram showing an electric circuit of the portable telephone apparatus according to the third embodiment;

FIG. 10A is a side view of a portable telephone apparatus in an extended state where the main housing and the movable housing extendedly slide in a longitudinal direction, according to a fourth embodiment of the present invention;

FIG. 10B is a plan view of the portable telephone apparatus of FIG. 10A;

FIG. 10C is a rear view of the portable telephone apparatus of FIG. 10A;

FIG. 11A is a side view of the portable telephone apparatus in a retracted state where a main housing and a movable housing overlap one another, according to the fourth embodiment of the present invention;

FIG. 11B is a plan view of the portable telephone apparatus of FIG. 11A; and

FIG. 11C is a rear view of the portable telephone apparatus of FIG. 11A.

DESCRIPTION OF THE PREFERRED EMBODIMENTS

First Embodiment

Figure 2A:
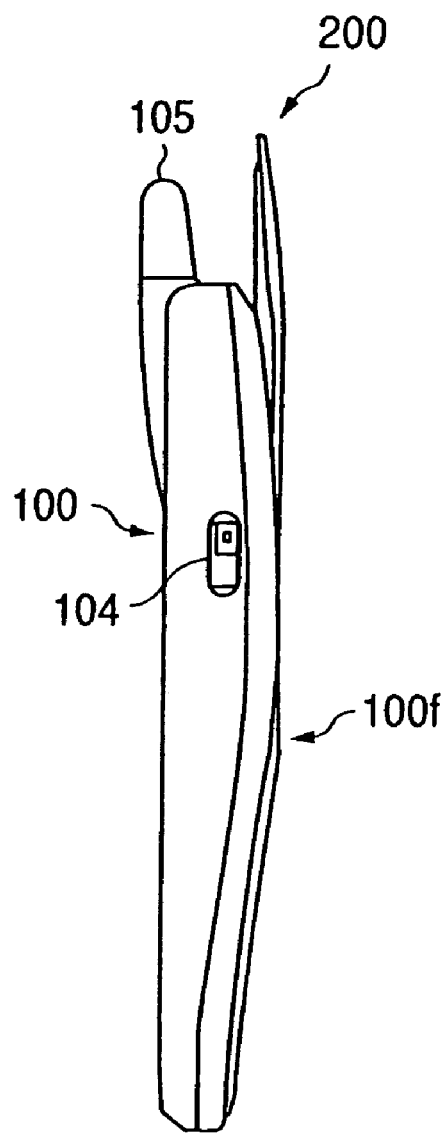
FIG. 2A is a side view of the portable telephone apparatus in an extended state where the main housing and the movable housing extendedly slide in a longitudinal direction, according to the first embodiment of the present invention.
Figure 2B:
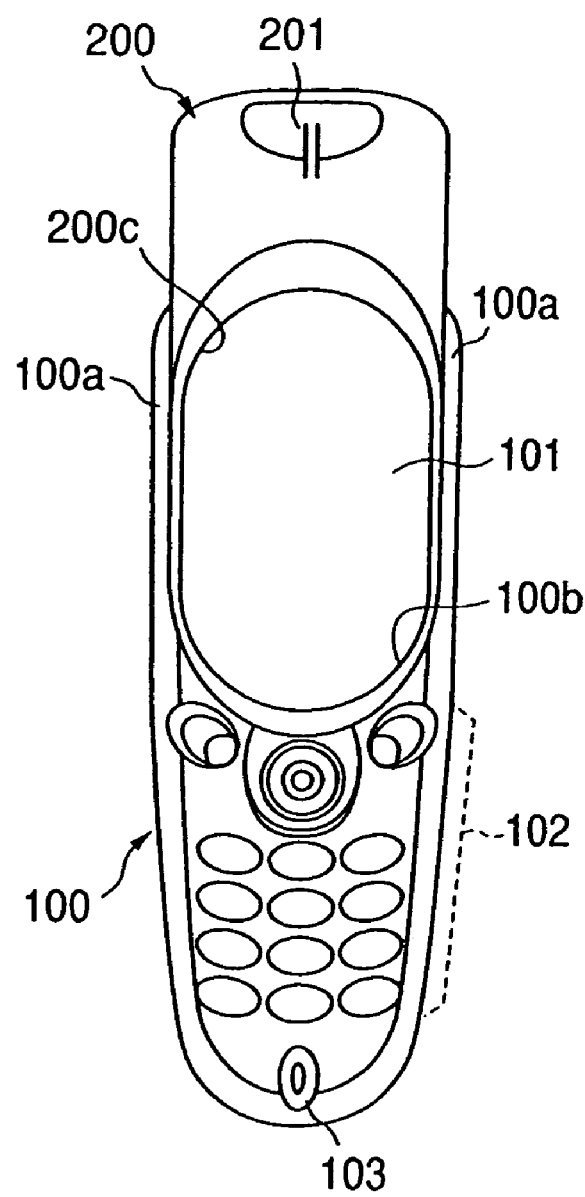
FIG. 2B is a plan view of the portable telephone apparatus of FIG. 2A.

As shown in FIGS. 1A, 1B, 2A, and 2B, a portable telephone set according to a first embodiment of the present invention is composed mainly of a main housing (first unit) 100 and a movable housing (second unit) 200, which are connected by a slide mechanism so that they are capable to freely sliding in a longitudinal direction. The movable housing 200 is shaped like an approximate plate and is engaged with the main housing 100 so as to be slidable upwardly in the longitudinal direction. FIGS. 1A and 1B show a retracted state and FIGS. 2A and 2B show an extended state. The slide mechanism will be described in FIG. 3.

The main housing 100 is a unit of nearly identical shape with an ordinary portable telephone and having the approximately same structure and functions as an ordinary portable telephone but a telephone receiver. The telephone receiver is mounted in the movable housing 200.

The main housing 100 has a large-size display section (LCD device) 101 provided in the upper half of the front-side surface 100f thereof, an operation section 102 provided under the display section 101 in the lower half of the front-side surface 100f thereof, and a telephone transmitter (microphone) 103 provided in the near end portion of the front-side surface 100f thereof. In the display section 101, a touch panel mechanism may be incorporated. A stopper-release operation member (one-touch slide button) 104 is provided on one side surface of the main housing 100. An antenna 105 is mounted on the backside top of the main housing 100. Within the main housing 100, an electronic circuit is accommodated, which will be described later.

More specifically, the center portion on the front-side surface of the main housing 100 is slightly recessed, where the display section 101 is placed. Groove-shaped guides allowing the movable housing 200 to be slidably mounted are formed on the inner side surfaces of frame members 100a, 100a which are formed on both sides of the front-side upper portion of the main housing 100, and further the inner surfaces of the main housing 100 following those of the frame members. The edge portion of the main housing 100 corresponding to the lower end portion of the display section 101 is shaped like an arc-shaped and recessed plate to form a first arc-shaped edge portion 100b.

The movable housing 200 is composed mainly of a flat hollow plate having two downward extending legs provided on both side portions thereof. The lower edge of the center portion of the movable housing 200 is shaped like an arc-shaped and recessed plate to form a second arc-shaped edge portion 200c, which corresponds to the first arc-shaped edge portion 100b (see FIG. 3). Accordingly, in the retracted state that the movable housing 200 has been slid downward as shown in FIG. 1, the movable housing 200 covers almost all the upper portion of the display section 101 and provides an appropriately circular opening area left between the first arc-shaped edge portion 100b and the second arc-shaped edge portion 200c to make the lower portion of the display section 101 visible through the opening area, allowing minimum important information to be displayed, as will be described later. In other words, the portable telephone 400 is structured so that, when retracted, the display section of the main housing is covered and protected with the movable housing 200 while a part of the display section is exposed. Further, the movable housing 200 has a telephone receiver (speaker) 201 incorporated in the center portion near the upper end portion on the front-side surface of the movable housing 200. The telephone receiver 201 is electrically connected to the internal electric circuit mounted within the main housing.

Figure 3:
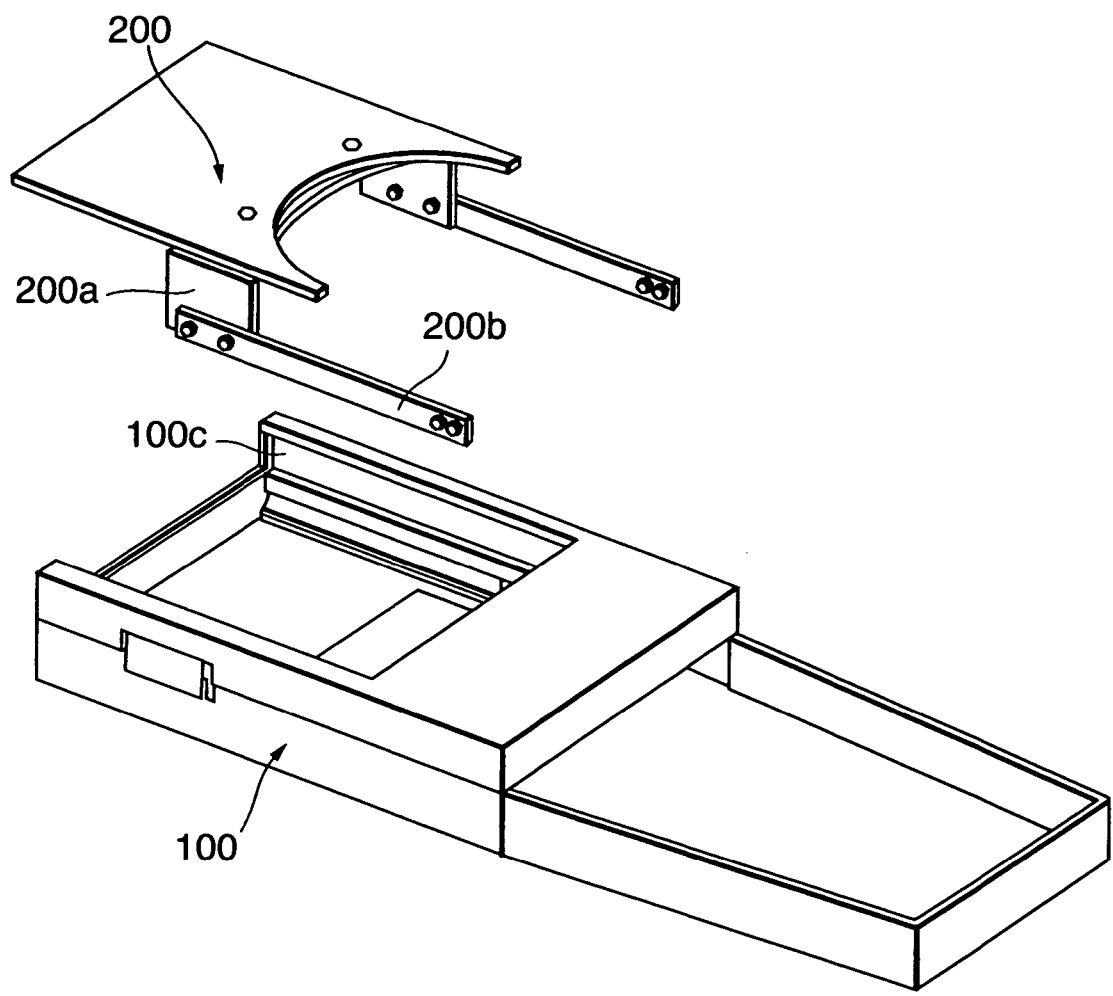
FIG. 3 is an exploded perspective view of an engagement mechanism of the main housing and the movable housing in the first embodiment.

As shown in FIG. 3, the main housing 100 has the guide grooves 100c formed on the left and right upper portions of the inside surfaces thereof. On the other hand, the movable housing 200 has a pair of protrusions 200a formed on the both sides of the rear surface of the movable housing 200, the protrusions 200a extending in a downward direction of the figure. The respective protrusions 200a have guide legs 200b fixed at the lower end portions thereof. The guide legs 200b are engaged with the guide grooves 100c of the main housing, respectively, which allows the movable housing 200 to be slidable in the longitudinal direction within a limited sliding range with respect to the main housing 100. It should be noted that the movable housing guides and the protrusions are out of sight in the case of a completed portable telephone.

The movable housing 200 is always urged in the upward direction that is an extending direction of the both housings, by an urging means disposed within the main housing 100. The urging means may be a coil spring engaged with the lower end portion of the guide legs 200g so as to pull it upward. It is preferable that an appropriate braking means is provided to act in parallel with the urging means so that the both housings slide slowly. In addition, a stopping means (locking mechanism) is provided to lock the movable housing 200 so as to keep the retracted state of the housings against the urging means. The stopping means may be a stopper that is engaged with a stopping hole provided in the guide leg 200b of the movable housing 200 when retracted. The locking of the stop means can be released by operating the stopper-release operation member 104 disposed on one of the side surfaces of the movable housing 200.

In this embodiment, when the stopper-release operation member 104 slides, the lock mechanism of the main housing 100 and movable housing 200 is released to cause the movable housing 200 to automatically slide upward with respect to the main housing 100 by the urging means to set the telephone set in a usable state as shown in FIG. 2. In the usable state, an appropriate distance is put between the transmitter 103 and the receiver 201. Further, the covered portion of the display section 101 becomes exposed to make all the display section visible, resulting in convenience in use. Instead of sliding the stopper-release operation member 104, the stopper-release operation member 104 may be depressed to release the lock mechanism.

In the present embodiment, an extension detector is disposed to determine whether the portable telephone is in the retracted state or extended state. More specifically, a micro switch is disposed at an appropriate position within the main housing 100. The micro switch turns on when the movable housing 200 slides downward so that a predetermined portion of the movable housing 200 closes the contact points of the micro switch. The extension detector can detects the slide state of the movable housing 200 by monitoring a state of the micro switch.

Next, an electric circuit of the portable telephone according to the present embodiment will be described.

Figure 4:
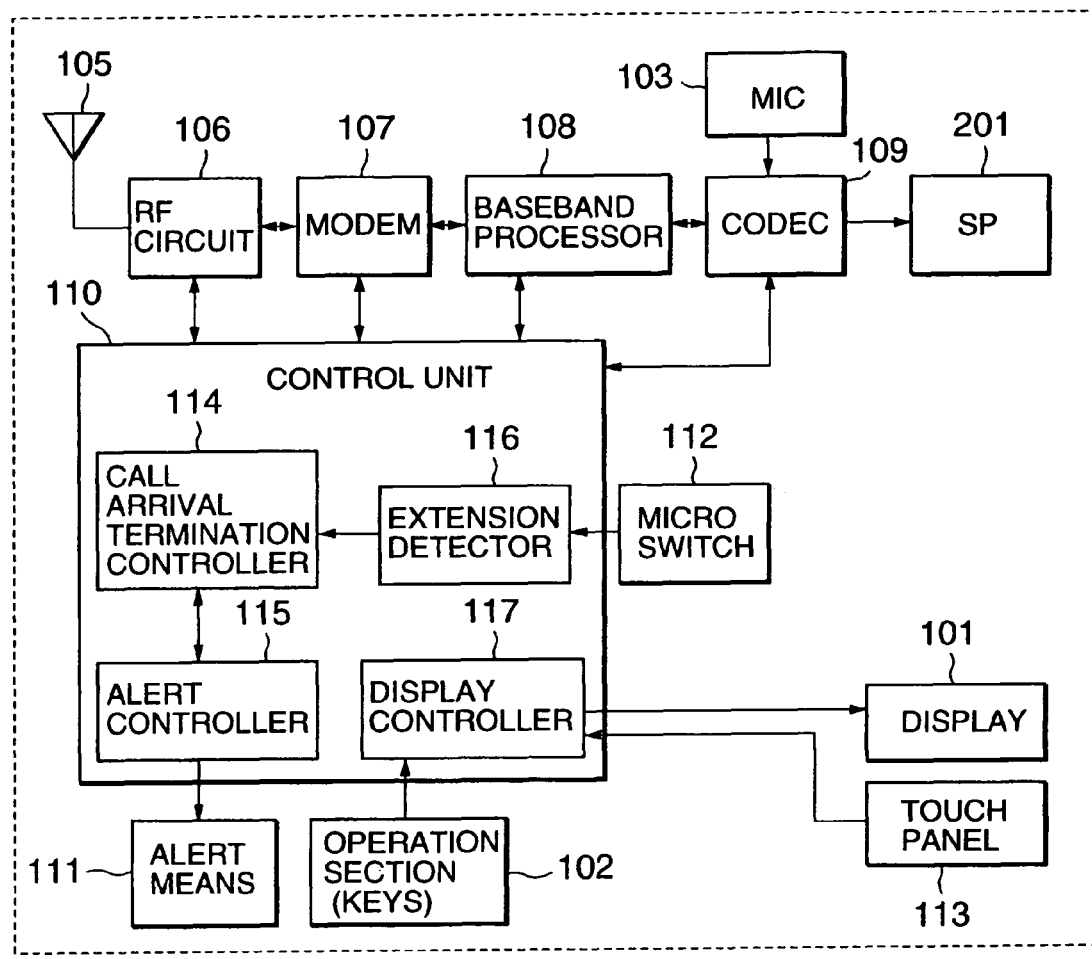
FIG. 4 is a schematic block diagram showing an electric circuit of the portable telephone apparatus according to the first embodiment.

As shown in FIG. 4, the portable telephone according to the present embodiment is structured to include an antenna 105, an RF circuit 106, a modem 107, a baseband processing circuit 108, a codec circuit 109, a control unit 110, a microphone 103, an operation section (operation keys) 102, an alert means 111 the display section (LCD) 101, the receiver (speaker) 213, the micro switch 112 used to detect a relative position of the main housing and the movable housing, and a touch panel mechanism 113 incorporated in the surface of the display section 101.

The control unit 110 includes an extension detector 116 that detects the retracted/extended state of the housings 100 and 200 based on the output of the micro switch 112, a display controller 117 that controls the displaying of the display section 101, a call arrival and termination controller 114 that can carry out a call arrival control operation corresponding to the retracted/extended state of the housings 100 and 200, and an alert controller 115 that can control a call arrival notification corresponding to the retracted/extended state of the housings 100 and 200.

The RF circuit 106 has a receiving circuit, a transmitting circuit, and a frequency synthesizer, which are not shown. The operation keys of the operation section 102 include a transmission key, conversion keys for alphabet/Kana/Kanji/numeral, a power source on/off key, across key for cursor operation, and an end key. Each circuit block as shown in FIG. 4 may use a known one and therefore the detailed descriptions will be omitted.

An operation of the portable telephone according to the embodiment will be described hereinafter.

First, in the case where the portable telephone acts as a telephone, an operation of transmitting and receiving a speech signal will be explained. The antenna 105 receives a radio signal from a base station, and transmits a radio signal. A radio signal received by the antenna 105 is output to a receiving circuit of the RF circuit 106. The receiving circuit selects a signal of a frequency indicated by a frequency synthesizer, and determines whether the selected signal includes a signal notifying of an incoming call to its own terminal (standby reception).

When the receiving circuit has detected a signal that notifies a call arrival to the own terminal, the receiving circuit notifies the call arrival to the control unit 110. The control unit 110 receives the notification from the receiving circuit that there is a call arrival to the own terminal, and drives the alert means 111 such as a beeper, a vibrator and/or a light-emitting diode to notify the user by sound, vibration and/or light blinking of the occurrence of an incoming call to the own terminal.

A user can set the portable telephone to a mode such that, when an incoming call occurs in the retracted state and then the extension detector 116 detects that the main housing and the movable housing are extended in a normal communication position, the call arrival and termination controller 114 automatically sets the operation to an off-hook state to connect the telephone line. In this setting, the reception signal transmitted from a call originating terminal is output to the modem 107 via the RF circuit 106. At the same time, the call arrival and termination controller 114 instructs the alert controller 115 to stop the alert operation.

Then, the modem 107 demodulates the reception signal to produce a baseband reception signal and output it to the baseband processing circuit 108. The baseband processing circuit 108 processes the baseband reception signal and outputs it to the codec circuit 109. The codec circuit 109 decodes the baseband reception signal to output a sound signal to the speaker (telephone receiver) 201, which outputs sound waves. The codec circuit 109 also encodes a sound signal received by the microphone 103 to output a transmission signal to the baseband processing circuit 108 and the transmission signal is transmitted to the destination through the modem 107 and the RF circuit 106. With this arrangement, the user can carry out communications immediately after the front-side and movable housings have been extended.

When the above setting has not been done or when the main housing 100 and the movable housing 200 have been already extended at the call arrival time, the telephone line is connected upon the off-hook operation of the user with a communication start key to allow communication.

When the user retracts the front-side and movable housings to the retracted state after termination of the conversation, the extension detector 116 detects this position change, and the call arrival and termination controller 114 automatically sets the operation state to the on-hook state (communication termination processing). Of course, the same communication termination can be made by the user operating a predetermined termination key for off-hook in the normal communication position.

The portable telephone according to the present embodiment is capable of transmitting and receiving character data or graphics data. The portable telephone monitors whether the selected signal includes a signal indicating transmission of character data to its own terminal (standby reception). When character data or graphics data has been received, the control unit 110 automatically receives the transmitted character data without waiting for the off-hook operation, and displays information in the display section 101 based on the received data.

In other words, a signal carrying character data received from the call originating terminal is output to the modem 107 via the RF circuit 106, and is demodulated by the modem 107. The demodulated signal enters the baseband processing circuit 108, which extracts character data from the demodulated signal, to output it to the control unit 110. The display controller 117 of the control unit 110 forms character information or graphic information to be displayed on the display section 101 based on data received from the baseband processing circuit 108. At the same time, the alert controller 115 drives the alert means 111 such as a beeper or a vibrator in a predetermined fashion different from that at the occurrence of an incoming call to notify the user that character data or graphics data has been received.

Further, the portable telephone can create message data and transmit it to a destination. In other words, alphabet letters and Katakana characters are allocated to dial operation keys such as 0 to 9, *, and # that are provided on the operation section 201, and these keys include a conversion key for alphabet/Kana/Kanji/numeral conversion. It is possible to input message data and transmit it to a destination designated by the user operating these dial operation keys and the conversion key.

The control unit 110 includes the a CPU, a ROM storing programs, data necessary to process various kinds of processing, and character font data, a RAM used as a work area, a Video RAM to display information on the display section 101, and the display controller 117 that controls the display section 101.

Particularly, in this portable telephone, when character data or graphics data is transmitted or received, it is possible to use the display section 101 as a horizontally oriented display unit if the user wishes. At this time, the display controller 117 displays the display contents on the display section 101 by converting the contents so as to match the direction of the horizontally oriented screen. Further, the processing instructed by a predetermined operation key is appropriately changed so as to match the direction of the horizontally oriented screen. A set of secondary operation keys may be provided in the movable housings, which will be enabled depending on a displaying orientation.

In this portable telephone, the lower portion of the display section 101 is always exposed but the lower portion is covered with the movable housing 200 in the retracted state. Therefore, a user can loot at necessary minimum information displayed on the lower portion of the display section 101 even when the portable telephone is not used. For example, the current time of day, receiving state, the remaining amount of battery, and the like may be displayed. Accordingly, this portable telephone, which has no secondary display, can provide the user with useful information even when retracted.

Furthermore, the displaying can be controlled depending on a slide state detected by the extension detector in order to achieve power saving. More specifically, the display controller 117 may drive the display section for each of predetermined segments, which allows the portion of the display section covered with the movable housing not to be driven when the extension detector has detected the retracted state.

In the case where the display section 101 is a backlit LCD, the display controller 117 may drive the backlighting section divisionally so that the portion of the display section covered with the movable housing is not driven but the other portion when the extension detector has detected the retracted state and all the display section is backlit when the extension detector has detected the extended state.

The display section 101 is not limited to an LCD, and may use an electro luminescent (EL). In the case of the EL display device, the display controller 117 may drive the EL display device divisionally so that the portion of the EL display device covered with the movable housing is not driven but the other portion when the extension detector has detected the retracted state and all the EL display device is driven when the extension detector has detected the extended state. In this manner, energy saving can be achieved.

Displayed contents may be changed depending on a slide state detected by the extension detector. More specifically, when retracted, an outline of information is displayed on the lower exposed portion of the display section 101. When extended, more detailed information is displayed in full screen. In this manner, content and form to be displayed are switched depending on the slide state. For example, the current time of day, receiving state, the remaining amount of battery, and the like are shifted to the top portion of the display section when the slide state is changed from the retracted state to the extended state. Such displayed content changes and the above-mentioned divisionally driving display may be combined.

As described above, the portable telephone according to the present embodiment can provide the following advantages. Since the movable housing can be accommodated into the main housing having the display section in the retracted state, both large-size display and the downsizing can be achieved. When retracted, a main portion of the display section is covered with the movable housing and therefore the display section is effectively protected. In the retracted state, a part of the display section is always exposed and therefore it is possible to display necessary minimum information without a secondary display section.

In addition, a one-touch sliding operation of the stopper-release operation member allows the portable telephone to be changed from the retracted state to the extended state. Accordingly, the normal use state can be obtained by operating a single button without using both hands every time, resulting in enhanced convenience in use.

Furthermore, it is possible to change display contents or switch the function of an operation key (soft-key) so as to meet the detected extended/retracted state of both units. When a call arrives in the retracted state, the extended state is obtained by only a slide operation of the stopper-release operation member, and at the same time, the off-hook operation is automatically performed, resulting in prompt response operations to the call arrival and increased convenience in use. When the portable telephone is retracted after completing communication, the call termination is automatically performed. This also allows increased convenience in use.

Second Embodiment

As shown in FIGS. 5A-5C, a portable telephone 400C according to a second embodiment of the present invention is composed mainly of a main housing 100C having a display section 101, an operation section 102, a transmitter 103, and a receiver 104, and a movable housing 200C which is engaged with the main housing 100C to be freely slidable in a longitudinal direction on one major surface of the main housing 100C.

The second embodiment is characterized in that a plurality of slide stop positions of the main housing 1000 and the movable housing 200C are previously provided. A first stop position such that the movable housing is slid at the lower-most position with protecting an operation section is shown in FIG. 5A. A second stop position such that the movable housing is slid at the middle position so that the upper half of the operation section is covered with the movable housing is shown in FIG. 5B. A third stop position such that the movable housing is slid at the upper most position is shown in FIG. 5C.

Figure 6:
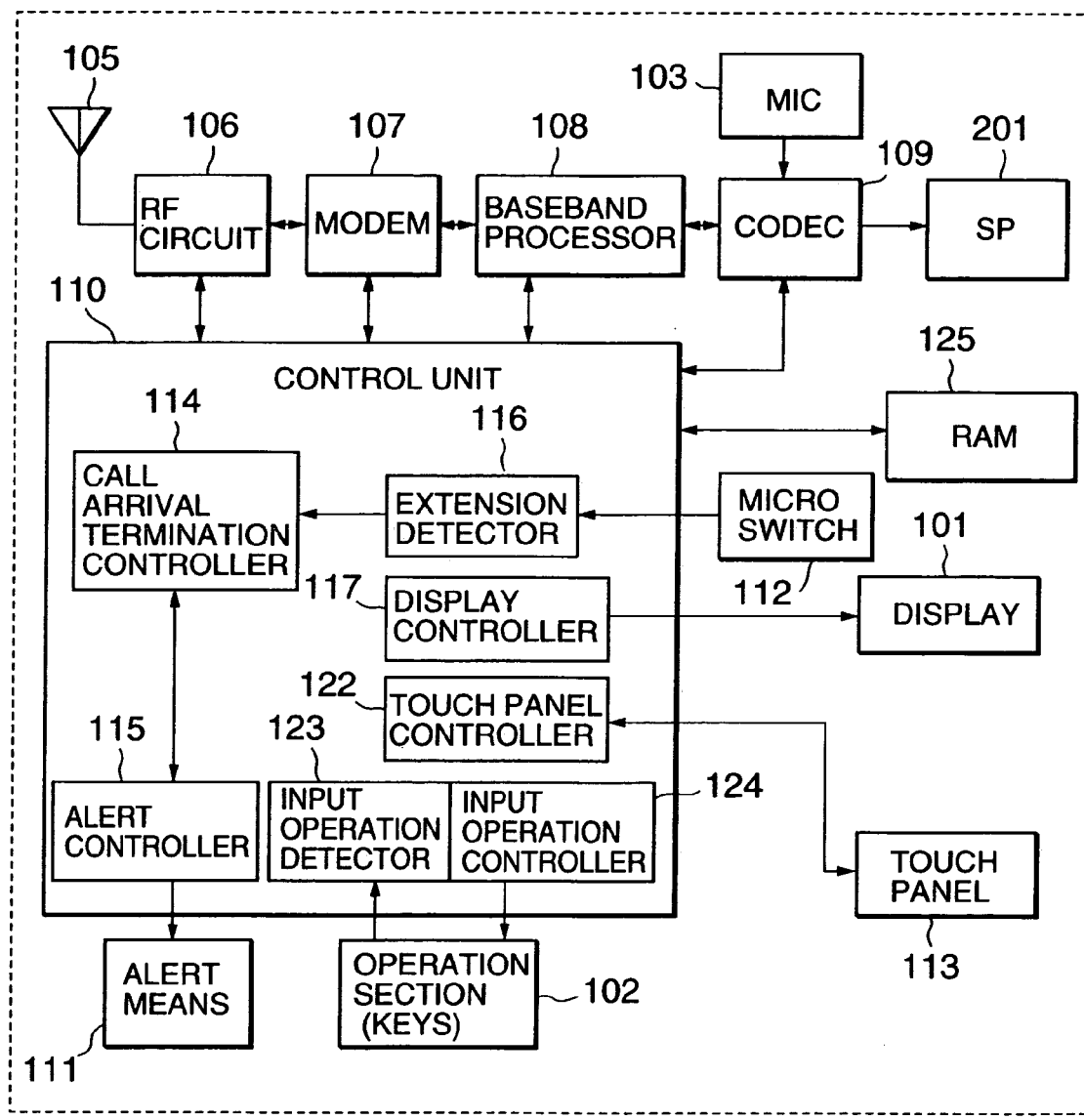
FIG. 6 is a schematic block diagram showing an electric circuit of the portable telephone apparatus according to the second embodiment.

As shown in FIG. 6, the second embodiment includes all circuits of the first embodiment as shown in FIG. 4 and further includes a touch panel controller 122, an input operation detector 123 fro detecting key operations, and an input operation controller 124. A memory (RAM) 125 is further provided to store various setting data.

The touch panel controller 122 enables or disables the touch panel function of the touch panel 113. When a slide operation between the main housing 100C and the movable housing 200C is detected, the touch panel controller 122 switches the touch panel function of the display section between the disabled state and the enabled state. In the present embodiment, a plurality of slide stop positions of the main housing 100C and the movable housing 200C are previously provided, and the touch panel controller 122 may increase/decrease the enabled area of the touch panel function on the display section 101 depending on a slide stop position of the main housing 100C and the movable housing 200C. For example, when the movable housing 200C is gradually opened from the retracted state to the extended state, the touch panel enabled area is increased: ¼, ½, . . . of the full screen of the display section 101.

The portable telephone may be provided with a slide stop position controller that determines a stop position of the movable housing 200C on the major surface of the main housing 100C. Depending on a stop position, some sections may be set to different functions.

The input operation controller 124 enables or disables the input operation with the operation section 102. In the present embodiment, the input operation controller 124 switches the input operation of the operation section 102 between the disabled state and the enabled state depending on a detected slide state of the main housing 100C and the movable housing 200C. In other words, the function control state is changed depending on a slide stop position. Since a plurality of slide stop positions of the movable housing 200C with respect to the main housing 100C are previously provided, the input operation controller 124 increases or decreases the enabled area, or the number of enabled keys, of the operation section depending on a slide stop position of the main housing 100C and the movable housing 200C. In the case where the function of the portable telephone is changed depending on which slide position is now set (for example, communication, WEB, e-mail, DB management, etc.), a preset enabled area such as only numeral keys, only direction-indicating keys, or all keys is made active or inactive depending on the slide position. Such key enabling/disabling information is stored as setting data in the memory (RAM) 125. The input operation detector 123 detects an operated key and controls the key operation validity.

Third Embodiment

As shown in FIGS. 7A-7C and 8A-8C, a portable telephone 400A according to a third embodiment of the present invention is provided with a main housing 100A and a movable housing 200A that is slidably engaged with the main housing 100A, which basically has the similar structure to the above-described first embodiment.

The main housing 100A has the almost same structure as that of the first embodiment. The movable housing 200A is mounted with an electronic image pick-up device (CCD camera) 202 and a fingerprint sensor 203, which are optical function sections and their optical aperture sections are formed in the rear surface 200r of the movable housing 200A.

The main housing 100A has a large-size display section (LCD device) 101 provided in the upper half of the front-side surface 100f thereof, an operation section 102 provided under the display section 101 in the lower half of the front-side surface 100f thereof, and a telephone transmitter (microphone) 103 provided in the near end portion of the front-side surface 100f thereof. In the display section 101, a touch panel mechanism may be incorporated. A stopper-release operation member (one-touch slide button) 104 is provided on one side surface of the main housing 100. An antenna 105 is mounted on the backside top of the main housing 100. Within the main housing 100, an electronic circuit is accommodated, which will be described later.

The main housing 100A has a pair of protruding members extending in a longitudinal direction at the respective upper portions of right and left sides thereof, which are used to be slidably coupled with the movable housing 200A. The center portion on the front-side surface of the main housing 100A is slightly recessed, where the display section 101 is placed. The edge portion of the main housing 100A corresponding to the lower end portion of the display section 101 is shaped like an arc-shaped and recessed plate to form a first arc-shaped edge portion 100b.

The movable housing 200A is slidably mounted to the upper portion of the main housing 100A and is composed mainly of a main portion 200d and a pair of leg-shaped members 200e, 200e. The main portion 200d is shaped like a flat plate and placed on the front-side surface of the display section. The respective leg-shaped members 200e, 200e overhang toward the backside from both side edges of the main portion 200d to form an approximately U-shaped cross section of the movable housing 200A. The respective leg-shaped members 200e, 200e have guide grooves formed extending in the longitudinal direction on the inside surfaces thereof. The respective guide grooves are engaged with the protruding members of the main housing to allow the movable housing 200A to slide only in the up and down directions with respect to the main housing 100A and thereby its sliding range is restricted. It should be noted that the movable housing guides and the protrusions are out of sight in the case of a completed portable telephone.

The lower edge of the center portion of the movable housing 200A is shaped like an arc-shaped and recessed plate to form a second arc-shaped edge portion 200c, which corresponds to the first arc-shaped edge portion 100b. Accordingly, in the retracted state that the movable housing 200 has been slid downward as shown in FIG. 8, the movable housing 200A covers almost all the upper portion of the display section 101 and provides an appropriately oval opening area left between the first arc-shaped edge portion 100b and the second arc-shaped edge portion 200c to make the lower portion of the display section 101 visible through the opening area, allowing minimum important information to be displayed, as will be described later.

Further, the movable housing 200A has a telephone receiver (speaker) 201 incorporated in the center portion near the upper end portion on the front-side surface thereof and has optical aperture sections of the CCD camera 202 and the fingerprint sensor 203 provided on the upper center portion of the backside surface of the movable housing 200A. The telephone receiver 201, the CCD camera 202 and the fingerprint sensor 203 are electrically connected to the internal electric circuit mounted within the main housing.

The movable housing 200A is always urged in the upward direction that is an extending direction of the both housings, by an urging means disposed within the main housing 100A. The urging means may be a coil spring engaged with the lower end portion of the leg-shaped member 200e of the movable housing 200A and the inside of the main housing 100A so as to pull the movable housing 200A upward. In addition, a stopping means (locking mechanism) is provided to lock the movable housing 200A so as to keep the retracted state of the housings against the urging means. The locking of the stopping means can be released by operating the stopper-release operation member 104 disposed on one of the side surfaces of the movable housing 200.

In this embodiment, when the stopper-release operation member 104 slides in the retracted state as shown in FIG. 8, the lock mechanism of the main housing 100A and movable housing 200A is released to cause the movable housing 200A to automatically slide upward with respect to the main housing 100A by the urging means to set the telephone set in a usable state as shown in FIG. 7. In the usable state, an appropriate distance is put between the transmitter 103 and the receiver 201. Further, the covered portion of the display section 101 becomes exposed to make all the display section visible, resulting in convenience in use. Furthermore, the optical aperture section of the CCD camera 202 is exposed allowing image capture from the backside thereof. In addition, the optical aperture section of the fingerprint sensor 203 is exposed allowing the fingerprint authentication function to be usable.

In the present embodiment, slide state determination is made by a combination of a magnet 204 (see FIG. 9) disposed at an appropriate position of the movable housing 200A and a magnetic sensor 118 (see FIG. 9) such as a Hall element disposed at a predetermined positing of the main housing 100A. The magnet 204 and the magnetic sensor 118 are disposed so that they get near each other when the movable housing 200A slides downward to the retracted state. The slide state can be detected by monitoring the output of the magnetic sensor 118.

Next, an electric circuit of the portable telephone according to the present embodiment will be described.

As shown in FIG. 9, the movable housing 200A is provided with the speaker 201 as well as the CCD camera 202, the fingerprint sensor 203, and the magnet 204. The main housing 100A includes an image processor 119, an authentication processor 120, and the magnetic sensor 118 in addition to circuits as shown in FIG. 4. The control unit 110 further includes a signal converter 121 for receiving image data from the image processor 119 and authentication data from the authentication processor 120. The extension detector 116 monitors an output of the magnetic sensor 118 to determine a slide position of the movable housing 200A. The detection signal of the extension detector 116 is used to perform call arrival and termination control and display control.

The second embodiment as described above also has various advantages similar to those of the first embodiment. In addition, the display section and the optical aperture sections of the optical function sections are almost covered with the movable housing. Accordingly, the CCD camera and the fingerprint sensor are effectively prevented from any dirt or flaw and thereby the protection performance thereof becomes higher.

Fourth Embodiment

A fourth embodiment of the present invention will be described with reference to FIGS. 10A-10C and FIGS. 11A-11C.

As shown in FIGS. 10A-10C and 11A-11C, a portable telephone 400B according to the fourth embodiment is provided with a main housing 100B and a movable housing 200B that is slidably engaged with the main housing 100B, which basically has the similar structure to the above-described first embodiment.

The main housing 100B is mounted with optical function sections of an electronic image pick-up device (CCD camera) 202 and a fingerprint sensor 203 and their optical aperture sections are formed in the rear surface 100r of the main housing 100B. The movable housing 200B is shaped like a sheath as one piece, which is engaged with the upper portion of the main housing 100B. In other words, the movable housing 200B is shaped like a tube having a bottom, or a sheath, and is mounted on the main housing 100B with its opening facing downward.

The main housing 100B has a large-size display section (LCD device) 101 provided in the upper half of the front-side surface 100f thereof, an operation section 102 provided under the display section 101 in the lower half of the front-side surface 100f thereof, and a telephone transmitter (microphone) 103 provided in the near end portion of the front-side surface 100f thereof. A stopper-release operation member (one-touch slide button) 104 is provided on one side surface of the main housing 100B. An antenna is not shown in the figures because it is mounted within the main housing 100B.

Further, The main housing 100B is mounted with the electronic image pick-up device (CCD camera) 202 and the fingerprint sensor 203 and their optical aperture sections are formed on the rear surface 100r of the main housing 100B at a predetermined portion that becomes exposed when the movable housing 200B is slid in the extending direction (see FIG. 10O). A pair of island-shaped frame portions 100g, 100g are provided at the center portion in the longitudinal direction on right and left sides of the main housing 100B, which are swelling portions formed like a step for slide guide extending in the longitudinal direction. An electric circuit is mounted within the main housing.

The movable housing 200B is shaped like a hollow sheath having an opening downward and has notches 200g, 200g formed in both sidewalls thereof, each corresponding to the island-shaped swelling portions 200g, 200g. The respective notches 200g, 200g are engaged with the island-shaped swelling portions 200g, 200g and thereby the sliding of the movable housing 200B is guided. When located at the lower end of the sliding range, the movable housing 200B covers all the front-side and backside upper portions of the main housing 100B, so that the apertures of the CCD camera 202 and the fingerprint sensor 203 are protected by the movable housing 200B covering them.

Similarly to the third embodiment, the front-side portion of the movable housing 200B can protect the main housing 100B. The lower edge portion of the center of the movable housing 200B is shaped like an arc-shaped and recessed plate to form a second arc-shaped edge portion 200c, which corresponds to the first arc-shaped edge portion 100b. Accordingly, in the retracted state that the movable housing 200B has been slid downward as shown in FIG. 11, the movable housing 200B covers almost all the upper portion of the display section 101 and provides an opening area left between the first arc-shaped edge portion 100b and the second arc-shaped edge portion 200c to make the lower portion of the display section 101 visible through the opening area.

The movable housing 200B is always urged in the upward direction that is an extending direction of the both housings, by an urging means disposed within the main housing 100B. In addition, a stopping means (locking mechanism) is provided to lock the movable housing 200B so as to keep the retracted state of the housings against the urging means. The locking of the stopping means can be released by operating the stopper-release operation member 104 disposed on one of the side surfaces of the main housing 100B.

In this embodiment, when the stopper-release operation member 104 slides in the retracted state as shown in FIG. 11, the lock mechanism of the main housing 100B and movable housing 200B is released to cause the movable housing 200B to automatically slide upward with respect to the main housing 100B by the urging means to set the telephone set in a usable state as shown in FIG. 10. In the usable state, an appropriate distance is put between the transmitter 103 and the receiver 201. Further, the covered portion of the display section 101 becomes exposed to make all the display section visible, resulting in convenience in use. Furthermore, the optical aperture sections of the CCD camera 202 and the fingerprint sensor 203 are exposed allowing the optical functions to be usable.

The electrical circuit mounted in the main housing 100B of the present embodiment is the same as that of the third embodiment and therefore the descriptions are omitted to avoid overlap. Similarly, slide state determination is also made by a slide status detector similar to that of the above-mentioned embodiments. The call arrival and termination control and the display control are performed depending on the detected slide state as similar to the third embodiment.

The fourth embodiment as described above also has various advantages similar to those of the third embodiment. In addition, the display section and the optical aperture sections of the optical function sections are almost covered with the movable housing. Accordingly, the CCD camera and the fingerprint sensor are effectively prevented from any dirt or flaw and thereby the protection performance thereof becomes higher.

The above-described embodiments have been described taking as an example the case where both of the electronic image pick-up device and the fingerprint input device are provided as the optical function section. Needless to say, the portable telephone may be provided with either the electronic image pick-up device or the fingerprint input device. In the present invention, the other components are not limited to the above-described embodiments. Various modifications may be possible without the scope of the present invention; for example, an EL display device is utilized for the display device in place of the LCD.

According to the present invention, the following advantages are obtained. Since the movable housing can be accommodated in the main housing having the display section when retracted, upsizing of display screen and downsizing of the telephone set are both achieved. When retracted, almost all display section of the main housing covered with the movable housing and thereby the display section is protected. On the other hand, even when retracted, a part of the display section is always exposed visibly. Accordingly, minimum information can be displayed on the exposed portion of the display section without the need of a secondary display section. Also, in the case where optical function sections such as a camera and a fingerprint sensor are provided, these sections are also accommodated and protected as described before.

Only a sliding operation of the stop-release operation member causes the portable telephone set to slide from the retracted state to the extended state. In other words, the usable state can be obtained by a simple operation of a single button (by one-touch), without extending by using both hands every time, resulting in increased convenience in use.

It is possible to detect the extended/retracted state of both housings and display content or a function of an operation key (soft-key) can switch depending on a detected state. When a call arrives in the retracted state, the extended state is obtained by only sliding operation of the stop-release operation member and, at the same time, an off-hook operation is carried out automatically, resulting in prompt response to an incoming call and therefore increased convenience in use. When detecting a shift from the extended state to the retracted state after completing communication, call termination is carried out automatically, resulting in increased convenience in use.

The invention claimed is:

1. A portable communication apparatus comprising:
   a main housing having at least a display section and an operation section;
   a movable housing engaged with the main housing so that said movable housing is freely slidable in a longitudinal direction between a retracted state and an extended state;
   an urging member for urging said main housing and said movable housing in an extension direction;
   a releasable lock mechanism for releasably locking said main housing and said movable housing in the retracted state, wherein the locking is released by a predetermined operation; and
   a display controller for divisionally driving the display section depending on a position of the movable housing with respect to the main housing such that the covered portion of the display section is not driven,
   wherein said movable housing is sheath-shaped such that the display section of said main housing and its side and back surfaces corresponding to the display section are covered with said movable housing when said main housing and said movable housing are in the retracted state, and
   wherein a portion of said display section of said main housing is covered and protected by said movable housing when said main housing and said movable housing are in the retracted state.

2. The portable communication apparatus according to claim 1, wherein said movable housing is allowed to be stopped at a desired one of a plurality of stop positions with respect to the main housing and the retracted state.

3. The portable communication apparatus according to claim 2, further comprising:
   an input operation controller for enabling an input operation of the operation section depending on a position of the movable housing with respect to the main housing.

4. The portable communication apparatus according to claim 3, wherein the input operation controller enables one of an input operation of at least one predetermined key and an input operation of all keys of the operation section depending on the position of the movable housing, and wherein setting data is preset to determine said at least one predetermined key.

5. The portable communication apparatus according to claim 1, wherein said main housing further includes a telephone-transmitter provided at a predetermined position thereof and said movable housing includes a telephone-receiver provided at a predetermined position thereof.

6. The portable communication apparatus according to claim 1, further comprising:
   an input operation controller for enabling an input operation of the operation section depending on a position of the movable housing with respect to the main housing.

7. The portable communication apparatus according to claim 6, wherein the input operation controller enables one of an input operation of at least one predetermined key and an input operation of all keys of the operation section depending on the position of the movable housing, and wherein setting data is preset to determine said at least one predetermined key.

8. The portable communication apparatus according to claim 1, further comprising:
   a touch panel mechanism provided on the display section.

9. The portable communication apparatus according to claim 8, further comprising:
   a touch panel controller for enabling a function of the touch panel mechanism depending on a position of the movable housing with respect to the main housing.

10. The portable communication apparatus according to claim 9, wherein said movable housing is allowed to be stopped at a desired one of a plurality of stop positions with respect to the main housing and the retracted state, and wherein the touch panel controller changes a touch panel function enabled area of the touch panel mechanism depending on a stop position of the movable housing.

11. The portable communication apparatus according to claim 1, further comprising:
   a touch panel mechanism provided on the display section; and
   a touch panel controller for enabling a function of the touch panel mechanism depending on a position of the movable housing with respect to the main housing.

12. The portable communication apparatus according to claim 11, further comprising:
   an input operation controller for enabling an input operation of the operation section depending on the position of the movable housing with respect to the main housing.

13. The portable communication apparatus according to claim 1, further comprising:
   an extension detector for detecting an extension state of said main housing and said movable housing.

14. The portable communication apparatus according to claim 13, wherein said extension detector comprises:
   a magnetic field generator provided at a predetermined position in said movable housing;
   a magnetic field detector provided at a predetermined position within said main housing; and
   an extension determiner for determining the extension state of said main housing and said movable housing based on a detection signal of said magnetic field detector.

15. The portable communication apparatus according to claim 1, wherein a displaying mode of the display section switches depending on which one of the extended state and the retracted state the main housing and the movable housing are set to.

16. The portable communication apparatus according to claim 1, further comprising:
   an alert device for alerting by at least one of sound, vibration, light emitting, and displaying; and an alert controller controlling said alert device such that said alert device is driven when an incoming call occurs and is stopped alerting when the main housing and the movable housing are shifted to a predetermined extension state.

17. The portable communication apparatus according to claim 1, further comprising:
a call arrival and termination controller controlling such that an operation state of said portable communication apparatus is set to off-hook when an incoming call occurs and the main housing and the movable housing are shifted to a predetermined extension state for normal communication, and on-hook when the main housing and the movable housing are shifted to the retracted state after completing communication.

18. A portable communication apparatus comprising:
a main housing having at least a display section and an operation section;
a movable housing engaged with the main housing so that said movable housing is freely slidable in a longitudinal direction between a retracted state and an extended state;
an urging member for urging said main housing and said movable housing in an extension direction;
a releasable lock mechanism for releasably locking said main housing and said movable housing in the retracted state, wherein the locking is released by a predetermined operation;
a backlighting lamp for illuminating the display section; and
a display controller for divisionally driving the display section and the backlighting lamp depending on a position of the movable housing with respect to the main housing such that a portion of the backlighting lamp corresponding to the covered portion of the display section is not driven,
wherein said movable housing is sheath-shaped such that the display section of said main housing and its side and back surfaces corresponding to the display section are covered with said movable housing when said main housing and said movable housing are in the retracted state, and
wherein a portion of said display section of said main housing is covered and protected by said movable housing when said main housing and said movable housing are in the retracted state.

19. A portable communication apparatus comprising:
a main housing having at least a display section and an operation section;
a movable housing engaged with the main housing so that said movable housing is freely slidable in a longitudinal direction between a retracted state and an extended state;
an urging member for urging said main housing and said movable housing in an extension direction;
a releasable lock mechanism for releasably locking said main housing and said movable housing in the retracted state, wherein the locking is released by a predetermined operation; and
at least one optical function section, each of which has an aperture section thereof, wherein said aperture section is provided on a surface of said main housing that is covered and protected by said movable housing when said main housing and said movable housing are in the retracted state, wherein said at least one optical function section is usable only when said aperture section is exposed by extending the said main housing and said movable housing and at least one aperature of said at least one optical function section is mounted on a surface of said main housing that is opposite to a surface upon which said display is visible,
wherein said movable housing is sheath-shaped such that the display section of said main housing and its side and back surfaces corresponding to the display section are covered with said movable housing when said main housing and said movable housing are in the retracted state.

20. The portable communication apparatus according to claim 19, wherein said at least one optical function section comprises at least one of a fingerprint authentication device and an electronic image pickup device.

* * * * *